United States Patent
Hayashida et al.

(10) Patent No.: US 7,452,609 B2
(45) Date of Patent: *Nov. 18, 2008

(54) ARTICLE HAVING COMPOSITE HARD COAT LAYER AND METHOD FOR FORMING COMPOSITE HARD COAT LAYER

(75) Inventors: Naoki Hayashida, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 280 days.

This patent is subject to a terminal disclaimer.

(21) Appl. No.: 10/499,648

(22) PCT Filed: Dec. 20, 2002

(86) PCT No.: PCT/JP02/13406

§ 371 (c)(1),
(2), (4) Date: Jun. 28, 2004

(87) PCT Pub. No.: WO03/055679

PCT Pub. Date: Jul. 10, 2003

(65) Prior Publication Data

US 2005/0106404 A1    May 19, 2005

(30) Foreign Application Priority Data

Dec. 26, 2001   (JP) ............................. 2001-395491

(51) Int. Cl.
  *B32B 27/30*   (2006.01)
  *B05D 3/02*   (2006.01)

(52) U.S. Cl. .................. 428/451; 427/372.2; 427/384; 427/385.5; 427/387; 427/407.1; 427/496; 427/503; 427/508; 427/515; 428/520

(58) Field of Classification Search ............. 428/451, 428/520; 427/372.2, 384, 385.5, 387, 407.1, 427/496, 503, 508, 515
See application file for complete search history.

(56) References Cited

U.S. PATENT DOCUMENTS 5,081,165 A   1/1992   Inukai et al. ............... 522/182

(Continued)

FOREIGN PATENT DOCUMENTS

EP    0 421 345 A2   4/1991

(Continued)

OTHER PUBLICATIONS

Derwent Publications, AN 1997-540425, JP 09-258003, Oct. 3, 1997.

*Primary Examiner*—D. S Nakarani
(74) *Attorney, Agent, or Firm*—Oblon, Spivak, McClelland, Maier & Neustadt, P.C.

(57) ABSTRACT

The present invention provides inexpensively an article with a hard coat excellent in anti-staining property, lubricity, scratch resistance and abrasion resistance. The present invention provides a method for forming the hard coat. A hard coat agent composition comprising an active energy ray-curable compound is applied onto a surface of an article 1 to be hard-coat-treated, thereby forming a hard coat agent composition layer, a surface material layer is formed by film-forming with a surface layer material comprising an active energy ray-curable compound having anti-staining property and/or lubricating property on the surface of the hard coat agent composition layer, and active energy rays are irradiated onto the formed hard coat agent composition layer and surface material layer so as to cure the two layers simultaneously, thereby forming a hard coat layer 2 contacting the surface of the article 1 and an anti-staining surface layer 3 contacting the surface of the hard coat layer 2.

20 Claims, 1 Drawing Sheet

U.S. PATENT DOCUMENTS

| | | | |
|---|---|---|---|
| 5,219,074 A * | 6/1993 | Mizuno et al. | 206/387.1 |
| 5,409,738 A * | 4/1995 | Matsunuma et al. | 427/502 |
| 5,580,633 A * | 12/1996 | Kuwahara et al. | 428/825.1 |
| 6,238,798 B1 * | 5/2001 | Kang et al. | 428/421 |
| 6,617,011 B2 * | 9/2003 | Wu et al. | 428/216 |

FOREIGN PATENT DOCUMENTS

| | | |
|---|---|---|
| JP | 1-98685 | 4/1989 |
| JP | 3-54214 | 3/1991 |
| JP | 6-211945 | 8/1994 |
| JP | 7-268036 | 10/1995 |
| JP | 09-100111 | 4/1997 |
| JP | 9-137117 | 5/1997 |
| JP | 9-159804 | 6/1997 |
| JP | 9-258003 | 10/1997 |
| JP | 10-7950 | 1/1998 |
| JP | 4-305450 | 10/1998 |
| JP | 11-060235 | 3/1999 |
| JP | 2000-109828 | 4/2000 |
| JP | 2000-144011 | 5/2000 |
| JP | 2000-301053 | 10/2000 |
| JP | 2001-187812 | 7/2001 |
| JP | 2001-194504 | 7/2001 |

* cited by examiner

ARTICLE HAVING COMPOSITE HARD COAT LAYER AND METHOD FOR FORMING COMPOSITE HARD COAT LAYER

TECHNICAL FIELD

The present invention relates to an article with a composite hard coat layer and a method for forming a composite hard coat layer. In the present invention, a composite hard coat layer includes a hard coat layer which is formed on a surface of an article and has scratch resistance and abrasion resistance, and an anti-staining surface layer which is formed on the surface of the hard coat layer and has anti-staining property and lubricity. More specifically, the present invention relates to an article having, on a surface thereof, a composite hard coat layer having anti-staining property, lubricity, scratch resistance and abrasion resistance in the field of various articles for which these properties are required, and a method for forming the composite hard coat layer.

In particular, the present invention concerns a method for forming a composite hard coat layer having anti-staining property, lubricity, scratch resistance and abrasion resistance on a surface of an optical recording medium, a magneto-optical recording medium, an optical lens, an optical filter, an anti-reflection film, or any one of various display elements such as a liquid crystal display, a CRT display, a plasma display and an EL display, without deteriorating these optical property and recording property, and also concerns an article on which this hard coat layer is formed.

BACKGROUND ART

Usually, a protective layer (hard coat layer) is given to the surface of various articles for which scratch resistance and abrasion resistance are required, for example, optical recording media such as a CD (Compact Disk) and a DVD (Digital Versatile Disk), magneto-optical recording media, an optical lens, an optical filter, an anti-reflection film, and various display elements such as a liquid crystal display, a CRT display, a plasma display and an EL display.

In many cases, stains such as a fingerprint, sebum, sweat and cosmetics are adhered to the surface of these articles by user's use of the articles. Once such stains are adheres thereto, they are not easily removed. This is a serious problem, in particular, for optical recording media or optical lenses used to record or reproduce the media since the recording and reproducing of information signals are remarkably obstructed by the adhered stains.

In magneto-optical recording media, a magnetic head runs on an organic protective layer formed on their recording layer. Accordingly, it is required that the abrasion resistance of the protective layer is made high and, simultaneously, the frictional coefficient thereof is made low.

As the method for solving the former problem, suggested are various methods of forming, on the surface of an optical lens or the like, a layer having a nature that stains do not adhere easily to the layer and even if stains adhere to the layer, the stains are easily wiped off, that is, a layer having anti-staining property. Specifically, the following method is adopted in many cases: a method of forming a layer made of a fluorine-containing compound or a silicone-based compound on the surface to give water repellency and oil repellency to the surface, thereby improving the anti-staining property.

About the method for overcoming the latter problem, that is, the method for decreasing the frictional coefficient of the surface of a protective layer (hard coat layer), many measures have been suggested so far. Specifically, the following method is used in many cases: a method of forming, on the surface of the protective layer, a film made of a liquid lubricant such as a fluorine-containing polymer (for example, perfluoropolyether) or a silicone polymer (for example, polydimethylsiloxane), thereby improving lubricity.

Originally, the former anti-staining property and the latter lubricity are entirely different properties. However, it is common to the two that a fluorine-containing compound or a silicone compound is used as means for giving each of these properties in many cases. Accordingly, problems common to the two are frequently caused when a fluorine-containing compound or a silicone compound is used to give anti-staining property or lubricity to the surface of a hard coat.

Many fluorine-containing compounds or silicone compounds are soft. Thus, when these compounds are used, it is very difficult to obtain a sufficient abrasion resistance. In order to overcome such a problem, the following method can be considered: a method of adding an inorganic filler made of $SiO_2$ fine particles or the like to a fluorine-containing polymer or silicone polymer matrix to make the abrasion resistance high. According to such a method, however, a little improvement is made but a satisfactory abrasion resistance cannot be obtained as far as the fluorine-containing polymer or silicone polymer is used as the matrix, wherein the inorganic filler is dispersed.

Therefore, the following method is considered: a method of making a protective layer into a lamination structure composed of two or more different layers, making the lower layer into a layer made of a highly hard material, and forming an upper layer made of a fluorine-containing compound or silicone compound on the surface thereof, thereby giving anti-staining property or lubricity. In this case, it is preferable to make the upper layer, which is made of the fluorine-containing compound or silicone compound, as thin as possible so as to reflect the hardness of the lower layer in the upper layer, which constitutes the topmost surface of the lamination protective layer. However, in this method, it is very difficult to obtain close adhesion between the lower layer and the upper layer which is made of the fluorine-containing compound or silicone compound.

As the method for solving the above-mentioned problem about the adhesion, for example, the following method is known: a method of forming a lower layer made of an inorganic material such as $SiO_2$ by such a process as sputtering or sol-gel process; forming, on the surface of the lower layer, an upper layer made of alkoxysilane having a fluoroalkyl group by such a process as vapor deposition or solution application; subjecting the resultant to heat treatment in the presence of a very small amount of water content so as to cause dehydration condensation between silanol groups generated by hydrolysis of the alkoxysilane and/or between the silanol groups and hydroxyl groups present in the surface of the lower layer made of $SiO_2$ or the like, whereby the upper layer is fixed onto the lower layer surface through chemical bonds and/or hydrogen bonds.

In this method, it is desired that the lower layer surface has active groups such as hydroxyl groups at a high density. Therefore, the material that can be used in the lower layer is limited to an inorganic material, in particular, a metal oxide or a metal chalcogenide such as $SiO_2$, $Al_2O_3$, $TiO_2$ or ZnS. Even when the lower layer is made of a metal oxide such as $SiO_2$, in order to make adhesion between this metal oxide and the alkoxysilane of the upper layer sufficient, it is necessary to subject the lower layer surface to activating treatment, such as alkali treatment, plasma treatment or corona discharge treatment, for increasing the density of active groups on the surface before the formation of the upper layer.

An attempt is also made for using a lower layer made of an organic material such as polyethylene, polycarbonate or polymethyl methacrylate; making the surface of the lower layer hydrophilic by such a method as plasma treatment or corona discharge treatment; and forming an upper layer made of the same alkoxysilane as described above on the surface of the lower layer. In this case, however, the adhesion is far poorer than in the case that the above-mentioned inorganic material is used as the lower layer. Thus, a sufficient endurance is not obtained.

In the case that a substrate to be hard-coat-treated is made of resin, according to the above-mentioned method in which an inorganic material such as $SiO_2$ is used as the lower layer, it is very difficult to obtain the abrasion resistance of the hard coat. When the layer made of the inorganic material such as $SiO_2$ is deposited on the surface of the resin substrate, the thickness of the film which can be formed is at most about several hundred nanometers. It is difficult from the standpoint of the production process thereof to make the film thickness larger than such a value. Even if such a film can be formed, the inorganic film self-breaks easily since a difference in elastic modulus or thermal expansion coefficient between the inorganic film and the substrate is remarkably large. It is however difficult that the inorganic film having a thickness of several hundred nanometers gives a sufficient abrasion resistance. It is also difficult to obtain a sufficient adhesion between the resin substrate and the inorganic film. Consequently, the inorganic film is easily peeled. From this viewpoint, it is difficult to obtain a sufficient abrasion resistance, as well.

Therefore, in the case that the substrate to be hard-coat-treated is made of resin, it is necessary to form a primer layer having a high elastic modulus on the resin substrate, form a lower layer made of the same inorganic film as described above on the primer layer, thereby keeping the adhesion between the resin substrate and the inorganic film and the strength of the inorganic film, subject the surface of the lower layer to activating treatment, and form an upper layer made of the same fluorine-containing alkoxysilane as described above on the lower layer surface. Since it is necessary to form the three layers successively in this way, the productivity is very poor.

Japanese Laid-open Patent Publication No. 9-137117 (1997) discloses a method of applying, onto a surface of a resin substrate, a composition comprising a polymerizable compound having in the molecule thereof at least two (meth)acryloyloxy groups and inorganic compound fine particles such as silica fine particles; photo-polymerizing and curing the polymerizable compound by irradiation of active energy rays; subjecting the surface of this cured film to corona treatment or plasma treatment; and then applying, onto the treated surface, a silane compound having in the molecule thereof at least one group which can generate a silanol group by hydrolysis, thereby forming a silane compound coat having an improved adhesion to the above-mentioned cured film. In this case, in order to keep the adhesion between the silane compound coat as the upper layer and the cured film as the lower layer, it is likewise necessary to subject the cured film surface to corona treatment or plasma treatment.

In the case that about an organic protective layer of the above-mentioned magneto-optical recording medium a liquid lubricant such as perfluoropolyether or polydimethylsiloxane is applied onto the surface of the organic protective layer to form a lubricant film, the adhesion between the organic protective layer and the liquid lubricant film may not be considered very much since the lubricant is a viscous liquid. However, there is a possibility in that the lubricant is decreased by sliding a magnetic field modulating head repeatedly for a long term or the lubricant volatizes little by little in storage of the recording medium over a long term. In this method, therefore, it is desirable that the lubricant is firmly fixed on the organic protective layer surface.

Meanwhile, in order to obtain anti-staining property, it is necessary to give water repellency or oil repellency to the surface of a protective layer, as described above. However, this manner is not necessarily sufficient. The operation of wiping off adhering stains is generally carried out by users. Therefore, in order that users can feel that the operation of wiping off stains is easy at the time of carrying out this operation, it is necessary to decrease the frictional coefficient of the protective layer surface. Relationship between the anti-staining property of an article and the frictional coefficient thereof has hardly been pointed out so far. In reality, however, in order to give anti-staining property, it is essential to make the frictional coefficient low as well as give water repellency and oil repellency.

By making the frictional coefficient of the surface low, an impact caused when a hard projection contacts the surface can be slipped away; therefore, the generation of scratches can be suppressed. Accordingly, from the standpoint of improving the scratch resistance of the hard coat, it is required to make the frictional coefficient of the surface low, as well.

Japanese Laid-open Patent Publication Nos. 6-211945 (1994) and 2000-301053 disclose the formation of a hard coat layer by: applying, onto a substrate, a composition wherein fluoroalkyl acrylate and an acrylic monomer incompatible with this are dissolved at a given ratio in a solvent capable of dissolving the two; and irradiating electron rays onto the composition immediately after the application so as to cure the composition. According to these publications, by the application of the composition into a thickness of 1 to 15 μm and the irradiation of the electron rays immediately after the application, the solvent is instantaneously vaporized. Additionally, the fluoroalkyl acrylate compound and the acrylic monomer are localized so that the composition is cured in the state that the fluoroalkyl acrylate is distributed unevenly in the surface of the coat.

However, according to the two publications, it is necessary to irradiate the electron rays onto the composition so as to cure the composition instantaneously after the application of the composition and before the uneven distribution based on the volatilization of the solvent because the composition containing the components incompatible with each other is used. Accordingly, the timing of irradiating the electron rays after the application is difficult and the method for the application is restricted very much. Coating methods in which the evaporation rate of the solvent is large, for example, spin coating cannot be used.

A most serious problem in the methods disclosed in the publications is that there is a high possibility in that since the solvent is vaporized at the same time when the electron rays are irradiated, the solvent in the cured coat cannot be completely removed. In the publications, it is not at all examined whether the solvent is completely removed from the cured coat or not. In the case that a very small amount of the solvent remains inside, no problem is caused immediately after the formation of the hard coat but there is a possibility in that the coat is cracked or peeled after the use of the article with the coat over a long term. The hardness also becomes insufficient. Thus, a warp of the substrate on which the hard coat is formed is apt to increase gradually.

In the method of vaporizing the solvent at the same time when the electron rays are irradiated, the cured coat is apt to have a porous structure. Thus, the hardness thereof is insufficient and, further, the optical property may deteriorate. Accordingly, even if no problem is caused in the case of applying this method to the production of familiar articles, it is difficult to apply the method to the production of articles for which a very high optical property is required, for example, an optical lens or an optical recording medium.

In short, a hard coat wherein anti-staining property, lubricity and abrasion resistance are simultaneously realized at high levels has never been known so far.

DISCLOSURE OF THE INVENTION

Objects of the Invention

An object of the present invention is to solve the above-mentioned problems in the background art and to provide inexpensively an article with a hard coat excellent in anti-staining property, lubricity, scratch resistance and abrasion resistance. Still another object of the present invention is to provide a method for forming a hard coat excellent in anti-staining property, lubricity, scratch resistance and abrasion resistance inexpensively and easily.

SUMMARY OF THE INVENTION

The present inventors made eager investigation. As a result, the present inventors have found out that a hard coat layer having scratch resistance and abrasion resistance is cured/made on a surface of an article, and an anti-staining surface layer having anti-staining property and lubricity is cured/made on the surface of the hard coat layer simultaneously by irradiating active energy rays onto the two layers, thereby forming a composite hard coat layer in which the anti-staining surface layer and the hard coat layer are firmly adhered to each other. Thus, the present invention has been made.

A first aspect of the present invention is an article with a composite hard coat layer comprising a hard coat layer on the surface of the article and an anti-staining surface layer on the surface of the hard coat layer, wherein the hard coat layer is made of a cured product of a hard coat agent composition comprising an active energy ray-curable compound, the anti-staining surface layer is made of a cured product of a surface layer material comprising an active energy ray-curable compound having anti-staining property and/or lubricating property, and the anti-staining surface layer is fixed on the hard coat layer. The words "is fixed" means that about the water repellency of the composite hard coat layer as described in Examples, the contact angle of water on the hard coat surface is 85 degrees or more at both of the initial time and the time after a cloth is slid on the surface. If the hard coat layer is not fixed, the contact angle of 85 degrees or more cannot be attained, in particular, after the sliding.

It is preferable in the first aspect of the present invention that the anti-staining surface layer has a thickness of 1 nm or more and 100 nm or less.

It is preferable in the first aspect of the present invention that the active energy ray-curable compound comprised in the hard coat agent composition is a compound having at least one reactive group selected from the group consisting of a (meth)acryloyl group, a vinyl group and a mercapto group.

It is preferable in the first aspect of the present invention that the active energy ray-curable compound comprised in the surface layer material is a compound having at least one reactive group selected from the group consisting of a (meth) acryloyl group, a vinyl group and a mercapto group.

It is preferable in the first aspect of the present invention that the active energy ray-curable compound comprised in the surface layer material comprises a compound having a moiety having silicone-based and/or fluorine-containing substituent, and having at least one reactive group selected from the group consisting of a (meth)acryloyl group, a vinyl group and a mercapto group.

It is preferable in the first aspect of the present invention that the hard coat agent composition comprises a photopolymerization initiator, and comprises an inorganic filler if necessary.

A second aspect of the present invention is a method for forming a composite hard coat layer comprising a hard coat layer and an anti-staining surface layer on a surface of an article, the method characterized in the steps of applying a hard coat agent composition comprising an active energy ray-curable compound onto a surface of an article to be hard-coat-treated, thereby forming a hard coat agent composition layer, film-forming, on the surface of the hard coat agent composition layer, with a surface layer material comprising an active energy ray-curable compound having anti-staining property and/or lubricating property, thereby forming a surface material layer, and irradiating active energy rays onto the formed hard coat agent composition layer and surface material layer so as to cure the two layers simultaneously, thereby forming a hard coat layer contacting the surface of the article and an anti-staining surface layer contacting the surface of the hard coat layer.

It is preferable in the second aspect of the present invention that the anti-staining surface layer is formed to have a thickness of 1 nm or more and 100 nm or less.

It is preferable in the second aspect of the present invention that after the hard coat agent composition is applied onto the surface of the article, thereby forming the hard coat agent composition layer, the hard coat agent composition layer is dried to remove a solvent contained in the hard coat agent composition from the hard coat agent composition layer, and then the surface material layer is formed on the surface of the hard coat agent composition layer.

It is preferable in the second aspect of the present invention that after the hard coat agent composition is applied onto the surface of the article, thereby forming the hard coat agent composition layer, the hard coat agent composition layer is dried if necessary, active energy rays are irradiated onto the hard coat agent composition layer to turn this composition layer into a half-cured state, and then the surface material layer is formed on the surface of the hard coat agent composition layer.

It is preferable in the second aspect of the present invention that the surface material layer is formed by film-forming with the surface layer material by applying or depositing.

It is preferable in the second aspect of the present invention that at the time of film-forming by applying the surface layer material, there is used, as a solvent, a solvent in which the active energy ray-curable compound in the already-formed hard coat agent composition layer is not substantially dissolved. In the case that the surface material layer is formed by applying the surface layer material, the surface material layer is dried after the applying.

It is preferable in the second aspect of the present invention that the active energy ray-curable compound comprised in the hard coat agent composition is a compound having at least one reactive group selected from the group consisting of a (meth)acryloyl group, a vinyl group and a mercapto group.

It is preferable in the second aspect of the present invention that the active energy ray-curable compound comprised in the surface layer material is a compound having at least one reactive group selected from the group consisting of a (meth) acryloyl group, a vinyl group and a mercapto group.

It is preferable in the second aspect of the present invention that the active energy ray-curable compound comprised in the surface layer material comprises a compound having a moiety having silicone-based and/or fluorine-containing substituent, and having at least one reactive group selected from the group consisting of a (meth)acryloyl group, a vinyl group and a mercapto group.

It is preferable in the second aspect of the present invention that the active energy rays are electron rays or ultraviolet rays.

It is preferable in the second aspect of the present invention that the active energy rays are irradiated in an atmosphere having an oxygen concentration of 500 ppm or less.

A third aspect of the present invention is an article with a composite hard coat layer comprising a hard coat layer on a surface of the article and an anti-staining surface layer on a surface of the hard coat layer, wherein the article is obtained by applying a hard coat agent composition comprising an active energy ray-curable compound onto a surface of an article to be hard-coat-treated, thereby forming a hard coat agent composition layer, film-forming, on the surface of the hard coat agent composition layer, with a surface layer material comprising an active energy ray-curable compound having anti-staining property and/or lubricating property, thereby forming a surface material layer, and irradiating active energy rays onto the formed hard coat agent composition layer and surface material layer so as to cure the two layers simultaneously, thereby forming a hard coat layer contacting the surface of the article and an anti-staining surface layer contacting the surface of the hard coat layer.

It is preferable in the present invention that the article is an optical recording medium, a magneto-optical recording medium, an optical lens, an optical filter, an anti-reflection film, or any one of various display elements. Examples of the display element include a liquid crystal display, a CRT display, a plasma display and an EL display.

In the specification, the wording "a hard coat agent composition layer" means a hard coat layer which has not been cured or has been half-cured (i.e., has been partially cured). The wording "a surface material layer" means a surface layer, namely an anti-staining surface layer, which has not been cured.

MODES FOR CARRYING OUT THE INVENTION

Figure 1:
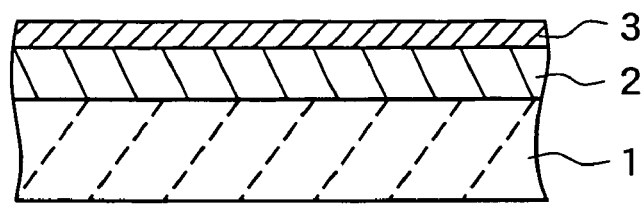
FIG. 1 is a sectional view which schematically illustrates an example of the layer structure of the article with a composite hard coat layer of the present invention.

The following describes the embodiment of the present invention in detail with reference to FIG. 1.

FIG. 1 is a sectional view which schematically illustrates an example of the layer structure of the article with a composite hard coat layer of the present invention. In FIG. 1, a hard coat layer 2 is formed on a surface of an article 1 to be hard-coat-treated, and an anti-staining surface layer 3 is formed to contact the surface of the hard coat layer 2. The combination of the hard coat layer 2 and the anti-staining surface layer 3 is referred to as the composite hard coat layer for the sake of convenience.

Examples of the article 1 include various objects for which hard coat treatment is necessary. Specific examples thereof include sheets or substrates made of a thermoplastic resin such as polyethylene terephthalate (PET), polymethyl methacrylate, polyethylene, polypropylene and polycarbonate. However, the article 1 is not limited to these examples. More specific examples of the article include an optical recording medium, a magneto-optical recording medium, an optical lens, an optical filter, an anti-reflection film, and various display elements such as a liquid crystal display, a CRT display, a plasma display and an EL display.

First, a hard coat agent composition containing an active energy ray-curable compound is applied onto a surface of the article 1 so as to form a hard coat agent composition layer. Next, a surface material layer is formed by film-forming with a surface layer material containing an active energy ray-curable compound having anti-staining property and/or lubricating property on the surface of the hard coat agent composition layer. The following describes respective components of the hard coat agent composition and the surface layer material.

The active energy ray-curable compound contained in the hard coat agent composition is any compound having at least one active group selected from a (meth)acryloyl group, a vinyl group and a mercapto group. The structure of this compound is not particularly limited. The active energy ray-curable compound preferably contains a polyfunctional monomer or oligomer containing, in the single molecule thereof, 2 or more, preferably 3 or more polymerizable groups in order to give a sufficient hardness to a hard coat.

Among such active energy ray polymerizable compounds, examples of the compound having a (meth)acryloyl group include 1,6-hexanediol di(meth)acrylate, triethylene glycol di(meth)acrylate, ethylene oxide modified bisphenol A di(meth)acrylate, trimethylolpropane tri(meth)acrylate, pentaerythritol tetra(meth)acrylate, ditrimethylolpropane tetra (meth)acrylate, dipentaerythritol hexa(meth)acrylate, pentaerythritol tri(meth)acrylate, 3-(meth)acryloyloxyglycerin mono(meth)acrylate, urethane acrylate, epoxy acrylate, and ester acrylate. However, the compound having a (meth)acryloyl group is not limited to these examples.

Examples of the compound having a vinyl group include ethylene glycol divinyl ether, pentaerythritol divinyl ether, 1,6-hexanediol divinyl ether, trimethylolpropane divinyl ether, ethylene oxide modified hydroquinone divinyl ether, ethylene oxide modified bisphenol A divinyl ether, pentaerythritol trivinyl ether, dipentaerythritol hexavinyl ether, and ditrimethylolpropane polyvinyl ether. However, the compound having a vinyl group is not limited to these examples.

Examples of the compound having a mercapto group include ethylene glycol bis(thioglycolate), ethylene glycol bis(3-mercaptopropionate), trimethylolpropane tris(thioglycolate), trimethylolpropane tris(3-mercaptopropionate), pentaerythritol tetrakis(mercaptoacetate), pentaerythritol tetrakis(thioglycolate), and pentaerythritol tetrakis(3-mercaptopropionate). However, the compound having a mercapto group is not limited to these examples.

The active energy ray-curable compounds contained in the hard coat agent composition may be used alone or in combination of two or more thereof.

The hard coat agent composition may contain a known photopolymerization initiator. The photopolymerization initiator is not particularly necessary when electron rays are used as the active energy rays. However, when ultraviolet rays are used, the initiator is necessary. Examples of a radical photo initiator, among the photopolymerization initiators, include a DAROCURE 1173, an IRGACURE 651, an IRGACURE 184, and an IRGACURE 907 (all of which are products manufactured by Ciba Specialty Chemicals Inc.). The content by percentage of the photopolymerization initiator is, for example, from about 0.5 to 5% by weight of the hard coat agent composition (as a solid content).

If necessary, the hard coat agent composition may contain an inorganic filler in order to improve the abrasion resistance. Examples of the inorganic filter include silica, alumina, zirconia and titania. The average particle size of the inorganic filler is preferably 100 nm or less, more preferably 50 nm or less in the case that transparency is particularly necessary.

In order to enhance the strength and the abrasion resistance of the cured coat, the surface of the inorganic filler is preferably modified with a compound having an active energy ray polymerizable group. The inorganic filler which has an average particle size of 50 nm or less and is surface-modified with a compound having an active energy ray polymerizable group may be made of reactive silica particles described in, for example, Japanese Laid-open Patent Publication Nos. 11-60235 (1999), 9-100111 (1997) and 2001-187812. This filler is preferably used in the present invention. The silica particles described in Japanese Laid-open Patent Publication No. 11-60235 (1999) contain a cation-reactive oxetanyl group as a reactive group, and the silica particles described in Japanese Laid-open Patent Publication No. 9-100111 (1997) contain a radical-reactive (meth)acryloyl group as a reactive group. The silica particles described in Japanese Laid-open Patent Publication No. 2001-187812 contain both of a radical-reactive unsaturated double bond of a (meth)acryloyl group or the like, and a cation-reactive group of an epoxy group or the like. The addition of such an inorganic filler to the hard coat composition makes it possible that the abrasion resistance of the hard coat layer is made higher. The content by percentage of the inorganic filler is, for example, from about 5 to 80% by weight of the hard coat agent composition (as a solid content). If the content of the inorganic filler is more than 80% by weight, the film strength of the hard coat layer tends to become weak.

If necessary, the hard coat agent composition may further contain a non-polymerizable diluting solvent, a photopolymerization co-initiator, an organic filler, a polymerization inhibitor, an antioxidant, an ultraviolet ray absorber, a photo-stabilizer, an antifoamer, a leveling agent, a pigment, a silicon compound and others. Examples of the non-polymerizable diluting solvent include isopropyl alcohol, n-butyl alcohol, methyl ethyl ketone, methyl isobutyl ketone, isopropyl acetate, n-butyl acetate, ethylcellosolve, and toluene.

The surface layer material is any material of which the cured film has anti-staining property and/or lubricating property. That is to say, the surface layer material is not particularly limited, provided that it imparts anti-staining property (water repellency and/or oil repellency) and/or lubricity to the surface layer and it has an active energy ray polymerizable functional group. For example, the surface layer material may be a silicone compound or a fluorine-containing compound containing at least one active energy ray polymerizable functional group selected from a (meth)acryloyl group, a vinyl group, and a mercapto group. Anti-staining property and/or lubricity is/are provided by the silicone-based substituent or the fluorine-containing substituent. Generally, the compound having the fluorine-containing substituent provides more excellent anti-staining property and/or lubricity, namely larger contact angle of water on the hard coat surface, than the compound having the silicone-based substituent. The silicone compounds may include compounds containing a moiety with a silicone-based substituent and at least one reactive group selected from a (meth)acryloyl group, a vinyl group, and a mercapto group. Specific examples include, but are not limited to, compounds as represented by the following formulae (1) to (3):

R—[Si(CH$_3$)$_2$O]$_n$—R  (1);

R—[Si(CH$_3$)$_2$O]$_n$—Si(CH$_3$)$_3$  (2); and

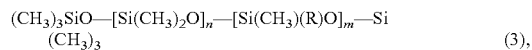

(CH$_3$)$_3$SiO—[Si(CH$_3$)$_2$O]$_n$—[Si(CH$_3$)(R)O]$_m$—Si(CH$_3$)$_3$  (3), wherein R is a substituent containing at least one reactive group selected from a (meth)acryloyl group, a vinyl group, and a mercapto group, n and m represent the degree of polymerization, n is in the range of 5 to 1000, and m is in the range of 2 to 100.

Examples of the fluorine-containing compound include a fluorine-containing (meth)acrylate compound. Specific examples of the fluorine-containing (meth)acrylate compound include fluorinated acrylates such as 2,2,3,3,3-pentafluoropropyl (meth)acrylate, 2,2,3,3-tetrafluoropropyl (meth)acrylate, 2,2,2-trifluoroethyl (meth)acrylate, 1H,1H,5H-octafluoropentyl(meth)acrylate, 3-(perfluoro-5-methylhexyl)-2-hydroxypropyl (meth)acrylate, 2-(perfluorooctyl) ethyl acrylate, 3-perfluorooctyl-2-hydroxypropyl (meth)acrylate, 2-(perfluorodecyl)ethyl (meth)acrylate, 2-(perfluoro-9-methyloctyl)ethyl (meth)acrylate, 3-(perfluoro-7-methyloctyl)ethyl (meth)acrylate, 2-(perfluoro-9-methyldecyl)ethyl (meth)acrylate, and 1H,H,9H-hexadecafluorononyl(meth)acrylate. However, the fluorine-containing (meth)acrylate compound is not limited to these examples. For example, it is also preferable to use a polymer such as perfluoropolyether into which a (meth) acrylate group is introduced, and a fluorine-containing compound having a vinyl or mercapto group instead of a (meth)acrylate group, or some other compound. More specific examples thereof include diacrylate of a Fombrin Z DOL (an alcohol-modified perfluoropolyether product manufactured by Ausimont Co.), and ART3 and ART4 (products manufactured by Kyoeisha Chemical Co., LTD.).

The active energy ray-curable compounds contained in the surface layer material may be used alone or in combination of two or more selected from the above-mentioned silicone compounds and fluorine-containing compounds. The active energy ray-curable compound contained in the surface layer material is preferably electron ray-curable compound. The surface layer material may contain, as a part of the components thereof, the active energy ray-curable compound used in the above-mentioned hard coat agent composition.

In the same manner for the hard coat agent composition, the surface layer material may contain a non-polymerizable diluting solvent, a photopolymerization initiator, a photopolymerization co-initiator, an organic filler, an inorganic filler, a polymerization inhibitor, an antioxidant, an ultraviolet ray absorber, a photo-stabilizer, an antifoamer, a leveling agent, a pigment, a silicon compound and others if necessary.

In the present invention, the above-mentioned hard coat agent composition is first applied onto the surface of the article 1 to form a hard coat agent composition layer. The coating method for the application is not limited, and may be any one of various coating methods such as spin coating, dip coating and gravure coating methods.

After the hard coat agent composition is applied onto the surface of the article 1 and before the film is formed with the surface layer material, it is preferable to remove the fluidity of the hard coat agent composition layer. The removal of the fluidity of the hard coat agent composition layer makes it possible to prevent a variation in the thickness of the hard coat agent composition layer or a deterioration in the surface flatness thereof when the film is formed with the surface layer material on this composition layer. In this way, the surface layer material can easily be made into a uniform film.

To remove the fluidity of the hard coat agent composition layer, for example, in the case that a diluting solvent is contained in the hard coat agent composition, it is advisable to dry, after the application of the composition, the applied layer so as to remove the solvent contained in the composition from the hard coat agent composition layer. It is also allowable to irradiate, after the application and optional drying of the applied layer, active energy rays such as ultraviolet rays onto the layer so as to turn the hard coat agent composition layer into a half-cured state. Attention should be paid to the irradiation of the active energy rays so as not to cure the hard coat agent composition layer completely. The word "half-cured" means that a part of the applied hard coat agent composition has not yet reacted. Accordingly, the physical hardness of the hard coat agent composition layer is not limited. Thus, the tackiness of the surface is allowed to be lost. The irradiation amount of the ultraviolet rays at this time, which depends on the thickness of the hard coat layer, is for example, from 1 to 500 mJ/cm$^2$, preferably from 1 to 200 mJ/cm$^2$. The ultraviolet ray irradiation amount of such a degree makes it possible that the hard coat agent composition layer is easily made into a half-cured state.

The thickness of the hard coat layer obtained by curing the hard coat agent composition layer is not particularly limited, and may be appropriately decided in accordance with the kind or the use of the article. In the case that the article is, for example, an optical recording disk, it is advisable to set the thickness into 1 μm or more and 10 μm or less, preferably 1 μm or more and 5 μm or less. If the thickness is less than 1 μm, a sufficient surface hardness cannot be given to the disk. If the thickness exceeds 10 μm, the disk tends to be cracked or largely warped.

Next, a surface material layer is formed by film-forming with the above-mentioned surface layer material on the surface of the hard coat agent composition layer which has not been cured or which has been partially cured (i.e., which is in the half-cured state). It is advisable to form the surface material layer in such a manner that the thickness of an anti-staining surface layer obtained after the surface material layer is cured will be made into 1 nm or more and 100 nm or less, preferably 5 nm or more and 50 nm or less. If the thickness is less than 1 nm, effects of anti-staining property and lubricity are not sufficiently obtained. If the thickness exceeds 100 nm, the hardness of the underlying hard coat layer is not sufficiently reflected. Thus, effects of scratch resistance and abrasion resistance decrease.

The film-forming can be conducted by the application or the deposition of the surface layer material. The surface layer material is applied by diluting the surface layer material with a suitable solvent and then applying the resultant coating solution by any one of various methods such as spin coating, dip coating, gravure coating, and spray coating methods. After the application, the resultant layer is dried.

It is preferred to use, as the solvent in this case, a solvent in which the active energy ray-curable compound in the hard coat agent composition layer which has not been cured or has been partially cured is not substantially dissolved. It depends on not only the kind of the solvent but also the coating method whether or not the hard coat agent composition layer is substantially dissolved. In many cases in which as the coating method of the surface material layer, for example, spin coating is used, almost all of the diluting solvent contained in the coating solution volatilizes when the spin coating is performed. Therefore, even if a solvent in which the hard coat agent composition layer is dissolved to some degree is used as the diluting solvent, no practical problems are caused. In the case that as the coating method of the surface material layer, for example, dip coating is used, the hard coat agent composition layer surface which has not been cured contacts the surface material layer coating solution for a long time. It is therefore necessary to use a solvent in which the hard coat agent composition layer material is not at all dissolved or is hardly dissolved.

Examples of the solvent which can be used in dip coating include saturated hydrocarbons such as n-hexane, cyclohexane, n-octane and isooctane, silicon compounds such as hexamethyldisiloxane, octamethyltrisiloxane and octamethylcyclotetrasiloxane, and fluorocarbons such as perfluorohexane, perfluoroheptane and perfluorooctane. Examples of the solvent which can be used in spin coating include isopropyl alcohol, n-butyl alcohol, dibutyl ether, ethylcellosolve, butylcellosolve, methyl perfluorobutyl ether, ethyl perfluorobutyl ether, HFC 43-10mee, and 1,1,2,2,3,3,4-heptafluorocyclopentane besides the above-mentioned various solvents.

In this way, the hard coat agent composition layer which has not been cured or has been partially cured and the surface material layer which is positioned on the surface thereof and has not been cured are formed.

Next, the formed hard coat agent composition layer and surface material layer are irradiated with active energy rays so as to be simultaneously cured. At this time, the active energy rays having an energy amount sufficient to cure the two layers completely are irradiated to complete the curing reaction of the two layers. At this time, the irradiation amount of electron rays is, for example, from 1 to 50 Mrad, preferably from 3 to 30 Mrad. The accelerating voltage of the electron rays is, for example, from 20 to 200 kV. However, in an optical recording medium comprising recording layer described later, the accelerating voltage is, for example, from 20 to 100 kV, preferably from 30 to 70 kV so as not to damage the recording layer. By curing, at the same time, the hard coat agent composition layer which has not been cured or has been partially cured and the surface material layer which is formed to contact the surface thereof and has not been cured, the two layers are firmly adhered to each other in the interface therebetween. That is, the cured anti-staining surface layer 3 adhered firmly onto the cured hard coat layer 2 is obtained.

By use of such a process of the present invention, it is possible to form, on the high-hardness hard coat layer 2, the anti-staining surface layer 3 which is so thin as to reflect the hardness thereof on the topmost surface and is good in water repellency and lubricity and, further, it is possible to obtain good adhesion between the hard coat layer 2 and the anti-staining surface layer 3.

As the means for curing the hard coat agent composition layer and the surface material layer simultaneously, suitable means selected from active energy rays such as ultraviolet rays, electron rays, and visible rays may be used. However, in the present invention, to set the thickness of the anti-staining surface layer into a very small value, such as a value of 1 nm or more and 100 nm or less, preferably 5 nm or more and 50 nm or less and obtain better adhesion of the surface layer to the hard coat layer, it is necessary to use the curing method capable of exhibiting the good reactivity near the interface of the both layer.

Specifically, if either electron rays or ultraviolet rays should be used as the active energy rays, it is preferable to conduct purging with inert gas such as nitrogen in such a manner that the oxygen concentration in the atmosphere for the active energy ray irradiation will be 500 ppm or less, preferably 200 ppm or less and more preferably 10 ppm or less. This is because the hindrance of the surface-curing, resulting from oxygen radicals generated in the irradiation atmosphere, is suppressed. Alternatively, known various oxygen-hindrance inhibitors may be added to the hard coat agent composition and/or the material having anti-staining and lubricating property instead of the control of the oxygen concentration in the irradiation atmosphere. Examples of such an oxygen-hindrance inhibitor include oxygen-hindrance inhibitors described in Japanese Laid-open Patent Publication Nos. 2000-109828, 2000-109828 and 2000-144011. Needless to say, it is allowable to use both of the oxygen-hindrance inhibitor and the control of the oxygen concentration in the irradiation atmosphere.

By use of such materials and such film-forming and film-curing methods, there is formed a composite hard coat layer which is excellent in abrasion resistance, water repellency and lubricity and is also good in persistence of these properties.

EXAMPLES

The present invention will be described more specifically by way of the following examples. However, the present invention is not limited to these examples.

Example 1

An ultraviolet ray-curable/electron ray-curable hard coat agent (DESOLITE Z7503, manufactured by JSR Corp.) was applied onto a polycarbonate substrate (thickness: 0.6 mm, diameter: 12 cm) by spin coating. Thereafter, the resultant was heated at 60° C. in the atmosphere for 3 minutes, to remove the diluting solvent in the coat. In this way, a hard coat layer which had not been cured was formed. The above-mentioned hard coat agent was a composition containing a reactive inorganic filler, disclosed in Japanese Laid-open Patent Publication No. 9-100111 (1997).

Next, a solution comprising 0.2% by mass of silicone acrylate (X-22-2445, manufactured by Shin-Etsu Chemical Co., Ltd.) which has the structure represented by following formula (4), and 99.8% by mass of n-octane was applied onto the above-mentioned hard coat layer which had not been cured by spin coating. The resultant was dried at 60° C. for 1 minute to form a surface layer which had not been cured.

$$R\text{—}[Si(CH_3)_2O]_n\text{—}R \quad (4)$$

(R: —$C_3H_6OCOCH=CH_2$, Polymerization degree n: about 40)

Next, electron rays was irradiated onto the surface layer under nitrogen flow, thereby curing the hard coat layer and the surface layer simultaneously. A CURETRON (manufactured by NHV Corp.) was used as an electron rays irradiating device, and the accelerating voltage of the electron rays and the irradiation amount thereof were set to 200 kV and 5 Mrad, respectively. The oxygen concentration in the irradiation atmosphere was 80 ppm. The thickness of the hard coat layer was 3.2 μm, and the thickness of the surface layer was about 21 nm. The thickness of the hard coat layer was measured with a stylus profilometer. The thickness of the surface layer was measured by X-ray fluorescence analysis (XRF), using silicone oil (KF-96, manufactured by Shin-Etsu Chemical Co., Ltd.) as a standard material. In this way, the substrate with the composite hard coat layer was obtained.

Example 2

An ultraviolet ray-curable/electron ray-curable hard coat agent (DESOLITE Z7503, manufactured by JSR Corp.) was applied onto a polycarbonate substrate (thickness: 0.6 mm, diameter: 12 cm) by spin coating. Thereafter, the resultant was heated at 60° C. in the atmosphere for 3 minutes, to remove the diluting solvent in the coat. In this way, a hard coat layer which had not been cured was formed.

Next, a solution comprising 0.2% by mass of 2-(perfluorodecyl)ethyl acrylate (manufactured by Daikin Fine Chemical laboratory Co.) and 99.8% by mass of FLUORINERT FC-77 (manufactured by Sumitomo 3M Ltd.) was applied onto the above-mentioned hard coat layer which had not been cured by spin coating. The resultant was dried at 60° C. for 3 minutes to form a surface layer which had not been cured. Thereafter, under the same electron ray irradiating condition as Example 1, electron rays was irradiated onto the surface layer under nitrogen flow, thereby curing the hard coat layer and the surface layer simultaneously. The thickness of the hard coat layer was 3.1 μm, and the thickness of the surface layer was about 30 nm. The thickness of the surface layer was measured by X-ray fluorescence analysis (XRF), using perfluoropolyether (DEMNUM, manufactured by Daikin Industries, Ltd.) as a standard material. In this way, the substrate with the composite hard coat layer was obtained.

Example 3

An ultraviolet ray-curable/electron ray-curable hard coat agent (DESOLITE Z7503, manufactured by JSR Corp.) was applied onto a polycarbonate substrate (thickness: 0.6 mm, diameter: 12 cm) by spin coating. The resultant was heated at 60° C. in the atmosphere for 3 minutes, to remove the diluting solvent in the coat. Thereafter, ultraviolet rays (a high-pressure mercury lamp, 100 mJ/cm$^2$) was irradiated in the atmosphere, a hard coat layer which had been half-cured was formed.

Next, 0.2 parts by weight of silicone acrylate (X-22-2445, manufactured by Shin-Etsu Chemical Co., Ltd.) and 0.04 parts by weight photo radical initiator (IRGACURE 907 manufactured by Ciba Specialty Chemicals Inc.) were added to 100 parts by weight of propylene glycol monomethyl ether solvent. This solution was applied onto the above-mentioned hard coat layer which had been half-cured by spin coating. The resultant was dried at 60° C. for 1 minute to form a surface layer which had not been cured.

Next, ultraviolet rays (a high-pressure mercury lamp, 2,000 mJ/cm$^2$) was irradiated onto the surface layer under nitrogen flow, thereby curing the hard coat layer and the surface layer simultaneously. The oxygen concentration in the ultraviolet ray radiation atmosphere was 5 ppm. The thickness of the hard coat layer was 3.2 μm, and the thickness of the surface layer was about 25 nm. The thickness of the surface layer was measured by X-ray fluorescence analysis (XRF), using silicone oil (KF-96, manufactured by Shin-Etsu Chemical Co., Ltd.) as a standard material. In this way, the substrate with the composite hard coat layer was obtained.

Comparative Example 1

5 parts by weight of 2-(perfluorooctyl)ethyl acrylate (manufactured by Daikin Fine Chemical laboratory Co.) was added, as a fluorinated acrylate, to 95 parts by weight of ultraviolet ray-curable/electron ray-curable hard coat agent (DESOLITE Z7503, manufactured by JSR Corp.) so as to prepare the uniform composition. This composition was applied onto a polycarbonate substrate (thickness: 0.6 mm, diameter: 12 cm) by spin coating. Thereafter, electron rays was immediately irradiated under nitrogen flow, thereby the substrate with the composite hard coat layer was obtained. Electron ray irradiating condition was the same as Example 1. The thickness of the hard coat layer was 3.0 µm.

Comparative Example 2

An ultraviolet ray-curable/electron ray-curable hard coat agent (DESOLITE Z7503, manufactured by JSR Corp.) was applied onto a polycarbonate substrate (thickness: 0.6 mm, diameter: 12 cm) by spin coating. The resultant was heated at 60° C. in the atmosphere for 3 minutes, to remove the diluting solvent in the coat. Thereafter, ultraviolet rays (a high-pressure mercury lamp, 2,000 mJ/cm$^2$) was irradiated in the atmosphere, a hard coat layer which had been completely cured was formed.

Next, a solution comprising 0.2% by mass of silicone acrylate (X-22-2445, manufactured by Shin-Etsu Chemical Co., Ltd.) and 99.8% by mass of n-octane was applied onto the above-mentioned hard coat layer which had been completely cured by spin coating. The resultant was dried at 60° C. for 1 minute to form a surface layer which had not been cured. Thereafter, under the same electron ray irradiating condition as Example 1, electron rays was irradiated onto the surface layer under nitrogen flow, thereby curing the surface layer. In this way, the substrate with the composite hard coat layer was obtained. The thickness of the hard coat layer was 3.3 µm, and the thickness of the surface layer was about 16 nm.

(Evaluation)

About the respective specimens produced in Examples 1 to 3 and Comparative Examples 1 and 2, the following performance tests were made.

(1) Abrasion Resistance

A steel wool #0000 was used, and the wool was reciprocated 20 times so as to be slid onto the hard coat surface of each of the specimens under a load of 4.9N/cm$^2$. The degree of injuries generated at this time was judged with the naked eye. The criterion for the judgment was as follows:

◯: No injuries were generated.

Δ: Injuries were slightly generated.

×: Injuries were generated.

(2) Water Repellency and Persistence Thereof

The contact angle of water to the hard coat layer surface of each specimen was measured. The measurement was made at initial time and after the specimen surface was slid with a cloth impregnated with a solvent respectively. Conditions for the sliding were as follows: a nonwoven cloth (Bemcot Lint-free CT-8, manufactured by Asahi Kasei Co., Ltd.) was impregnated with acetone, and the cloth was reciprocated 50 times to be slid on the specimen surface under a load of 4.9 N/cm$^2$. The contact angle was measured at a temperature of 20° C. and a relative humidity of 60%, using a contact angle meter CA-D manufactured by Kyowa Interface Science Co., Ltd.

TABLE 1

| | Surface layer | Abrasion resistance | Contact angle (degrees) | |
|---|---|---|---|---|
| | | | Initial | After the sliding |
| Example 1 | Silicone type | ◯ | 98.7 | 97.8 |
| Example 2 | Fluorine type | ◯ | 105.3 | 103.0 |
| Example 3 | Silicone type | ◯ | 96.1 | 93.4 |
| Comparative Example 1 | Fluorine type | ◯ | 67.0 | 65.7 |
| Comparative Example 2 | Silicone type | ◯ | 85.7 | 58.2 |

The results are shown in Table 1.

As can be seen from Table 1, each of the substrates of Examples 1 through 3 with respective hard coat layers had significantly high surface hardness, high water repellency, and high durability. Specifically, since fluorinated acrylate was used to anti-staining surface layer, the substrates with hard coat layer of Example 2 had an excellent performance.

Although the same material as in Example 2 was used in Comparative Example 1, the substrate of Comparative Example 1 showed significantly low water repellency at the initial time, as did it after the sliding with cloth. Specifically, its intended purpose was not achieved because the fluorinated acrylate components were not exposed on the coating surface just by applying the fluorinated acrylate-added active energy ray-curable resin onto the substrate and then curing it. Furthermore, in Comparative Example 1, significant unevenness of coating was observed during application of the prepared composition to the surface of the substrate. This is thought to occur since the diluent evaporates during spin-coating, and the acryl monomer and the fluorinated acrylates, which are incompatible to one another, rapidly underwent phase separation. This also makes the composition impractical for use in the hard coat.

Although the same material as in Example 1 was used in Comparative Example 2, the substrate of Comparative Example 2 showed lower water repellency than that of Example 1 at the initial time, and significantly low water repellency after the sliding with cloth. The reason why the surface layer was applied and cured after having been completely cured. That is, the adhesion between the surface layer and the hard coat layer was low.

Example 4

This example was a production example of an optical information medium with a composite hard coat layer (abbreviated to the optical disk). In this example, the produced optical disk was of a phase-change type. The present invention can be applied to various disks regardless of the kind of their recording layer. Thus, the present invention can be applied to not only this disk but also a read only type optical disk, a write once type optical disk or some other disk.

Figure 2:
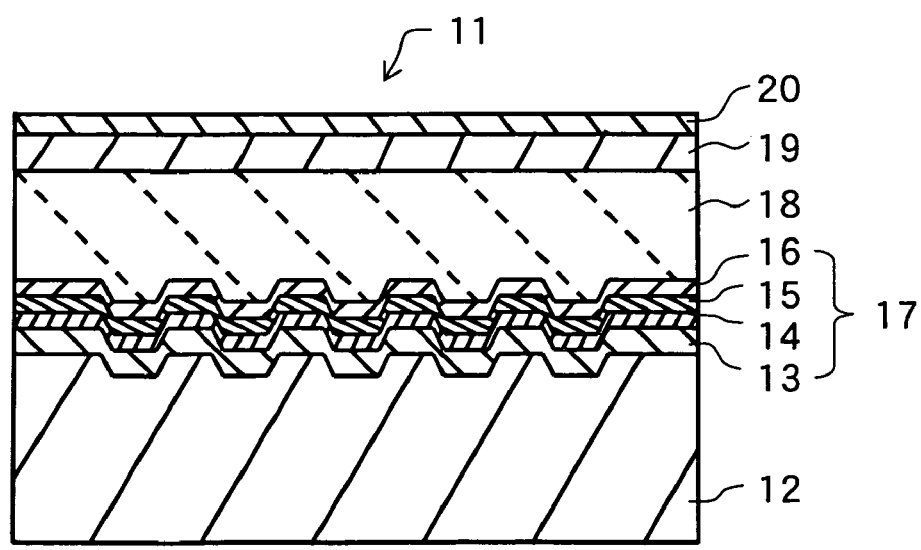
FIG. 2 is a schematic sectional view of an example of the optical disk with a composite hard coat layer of the present invention.

FIG. 2 is a schematic sectional view of an example of an optical disk with a composite hard coat layer. In FIG. 2, an optical disk 11 has, on a surface of a supporting substrate 12 in which fine concavity or convexity (such as information pits or pregrooves) are made, a reflecting layer 13, a second dielectric layer 14, a phase-change recording material layer 15, and a first dielectric layer 16 in this order. The disk 11 has a light-transmitting layer 18 on the first dielectric layer 16, and further has a hard coat layer 19 and an anti-staining surface layer 20 on the light-transmitting layer 18. In this example, the reflecting layer 13, the second dielectric layer 14, the phase-change recording material layer 15 and the first dielectric layer 16 constitute a recording layer 17. The combination of the hard coat layer 19 and the anti-staining surface layer 20 is referred to as the composite hard coat layer for the sake of convenience. The optical disk 11 is used in such a manner that a laser ray for recording or reproducing is radiated into the recording layer through the anti-staining surface layer 20, the hard coat layer 19 and the light-transmitting layer 18.

A sample of the optical disk having the layer structure illustrated in FIG. 2 was produced as follows.

The reflecting layer 13 made of $Al_{98}Pd_1Cu_1$ (atomic ratio) and having a thickness of 100 nm was formed on a surface of the disk-form supporting substrate 12 (made of polycarbonate, diameter: 120 mm, thickness: 1.1 mm), in which grooves for recording information were made, by sputtering. The depth of the grooves was $\lambda/6$ in an optical path length at wavelength $\lambda=405$ nm. The recording track pitch in a groove recording manner was set into 0.32 μm.

Next, a $Al_2O_3$ target was used to form the second dielectric layer 14 having a thickness of 20 nm on the surface of the reflecting layer 13 by sputtering. An alloy target made of a phase-change material was used to form the recording material layer 15 having a thickness of 12 nm on the surface of the second dielectric layer 14 by sputtering. The composition (atomic ratio) of the recording material layer 15 was set into $Sb_{74}Te_{18}(Ge_7In_1)$. A ZnS (80% by mole)-$SiO_2$ (20% by mole) target was used to form the first dielectric layer 16 having a thickness of 130 nm on the surface of the recording material layer 15 by sputtering.

Next, a radical-polymerizable ultraviolet ray-curable resin having the following composition was applied onto the surface of the first dielectric layer 16 by spin coating, and then ultraviolet rays were irradiated thereon so as to form the light-transmitting layer 18 in such a manner that the thickness thereof would be 98 μm after the layer 18 was cured.

(Light-Transmitting Layer: Composition of Ultraviolet Ray-Curable Resin)

| | |
|---|---|
| urethane acrylate oligomer: (DIABEAM UK6035, manufactured by Mitsubishi Rayon Co., Ltd.) | 50 parts by weight |
| isocyanuric acid EO modified triacrylate: (ARONIX M315, manufactured by Toagosei Co., Ltd.) | 10 parts by weight |
| isocyanuric acid EO modified diacrylate: (ARONIX M215, manufactured by Toagosei Co., Ltd.) | 5 parts by weight |
| tetrahydrofurfuryl acrylate: | 25 parts by weight |
| photopolymerization initiator(1-hydroxycyclohexyl phenyl ketone): | 3 parts by weight |

Next, an ultraviolet ray-curable/electron ray-curable hard coat agent having the following composition was applied onto the light-transmitting layer 18 by spin coating, and then the resultant was heated at 60° C. in the atmosphere for 3 minutes to remove the diluting solvent in the coat. In this way, the hard coat layer 19 which had not been cured was formed.

(Composition of Hard Coat Agent)
reactive group modified colloidal silica: 100 parts by weight (dispersing medium: propylene glycol monomethyl ether acetate, nonvolatile content: 40% by weight)

| | |
|---|---|
| dipentaerythritol hexaacrylate: | 48 parts by weight |
| tetrahydrofurfuryl acrylate: | 12 parts by weight |
| propylene glycol monomethyl ether acetate: (non-reactive diluting solvent) | 40 parts by weight |
| IRGACURE 184 (polymerization initiator): | 5 parts by weight |

Next, a solution comprising 0.25% by mass of 2-(perfluorodecyl)ethyl acrylate (manufactured by Daikin Fine Chemical laboratory Co.) and 99.75% by mass of FLUORINERT FC-77 (manufactured by Sumitomo 3M Ltd.) was applied onto the above-mentioned hard coat layer 19 which had not been cured by spin coating. The resultant was dried at 60° C. for 3 minutes to form the surface layer 20 which had not been cured.

Thereafter, electron rays was irradiated onto the surface layer under nitrogen flow, thereby curing the hard coat layer 19 and the surface layer 20 simultaneously. A Min-EB (manufactured by USHIO Inc.) was used as an electron rays irradiating device, and the accelerating voltage of the electron rays and the irradiation amount thereof were set to 50 kV and 5 Mrad, respectively. The oxygen concentration in the irradiation atmosphere was 80 ppm. The thickness of the hard coat layer 19 was 2.5 μm, and the thickness of the surface layer 20 was about 28 nm. The thickness of the surface layer was measured by X-ray fluorescence analysis (XRF), using perfluoropolyether (DEMNUM, manufactured by Daikin Industries, Ltd.) as a standard material. In this way, the optical recording disk sample No. 1 with the composite hard coat layer was obtained.

Comparative Example 3

In the same way as in Example 4, a reflecting layer 13, a second dielectric layer 14, a phase-change recording material layer 15, and a light-transmitting layer 18 were formed, in the oder, on a surface of a disk-form supporting substrate 12.

Next, an ultraviolet ray-curable/electron ray-curable hard coat agent having the following composition was applied onto the light-transmitting layer 18 by spin coating. Thereafter, electron rays was immediately irradiated onto the layer 18 under nitrogen flow. In this way, the optical recording disk sample No. 2 with the composite hard coat layer was obtained. Electron ray irradiating condition was the same as in Example 4. The thickness of the hard coat layer was 2.8 μm.

(Composition of Hard Coat Agent)
reactive group modified colloidal silica: 100 parts by weight (dispersing medium: propylene glycol monomethyl ether acetate, nonvolatile content: 40% by weight)

| | |
|---|---|
| dipentaerythritol hexaacrylate: | 48 parts by weight |
| tetrahydrofurfuryl acrylate: | 12 parts by weight |
| propylene glycol monomethyl ether acetate: (non-reactive diluting solvent) | 40 parts by weight |
| 2-(perfluorooctyl)ethyl acrylate | 5 parts by weight |
| IRGACURE 184 (polymerization initiator): | 5 parts by weight |

Comparative Example 4

In the same way as in Example 4, a reflecting layer 13, a second dielectric layer 14, a phase-change recording material layer 15, and a light-transmitting layer 18 were formed, in the oder, on a surface of a disk-form supporting substrate 12.

Next, an ultraviolet ray-curable/electron ray-curable hard coat agent having the same composition as used in Example 4 was applied onto the light-transmitting layer 18 by spin coating, and then the resultant was heated at 60° C. in the atmosphere for 3 minutes to remove the diluting solvent in the coat. Thereafter, ultraviolet rays (a high-pressure mercury lamp, 2,000 mJ/cm$^2$) was irradiated onto the layer 18 in the atmosphere, the hard coat layer which had been completely cured was formed.

Next, a solution comprising 0.25% by mass of silicone acrylate (X-22-2445, manufactured by Shin-Etsu Chemical Co., Ltd.) and 99.75% by mass of n-octane was applied onto the above-mentioned hard coat layer which had been completely cured by spin coating. The resultant was dried at 60° C. for 1 minute to form a surface layer which had not been cured. Thereafter, under the same electron ray irradiating condition as Example 4, electron rays was irradiated onto the surface layer under nitrogen flow, thereby curing the surface layer. In this way, the optical recording disk sample No. 3 with the composite hard coat layer was obtained. The thickness of the hard coat layer was 3.0 μm, and the thickness of the surface layer was about 21 nm.

(Evaluation)

About the respective optical recording disk samples Nos. 0.1 to 3 produced in Example 4 and Comparative Examples 3 and 4, an optical disk evaluating device (DDU-1,000, manufactured by Pulstec Industrial Co., Ltd.) was used to evaluate the recording/reproducing property under the following conditions:

laser wavelength: 405 nm;

objective lens numerical aperture NA: 0.85;

linear velocity: 6.5 m/s;

recording signals: 1-7 modulating signals (shortest signal length: 2 T); and recording area: groove recording.

(1) Abrasion Resistance

Random signals were recorded at a position about 40 mm apart in the radius direction from the center of the respective optical recording disk samples. The initial jitter values thereof were then measured. Next, a steel wool #0000 was reciprocated 20 times so as to be slid on the hard coat side surface of the respective disks under a load of 2.5 N/cm$^2$. Thereafter, the jitter values (jitter value after the test) were again measured. The direction in which the steel wool was slid was made into the radius direction of the disk, and the used steel wool had a size of 1.0 cm×1.0 cm.

(2) Anti-Staining Property

Random signals were recorded at a position about 40 mm apart in the radius direction from the center of the respective optical recording disk samples. The initial jitter values thereof were then measured. Next, a middle finger was pushed against a position of the hard coat side surface of the respective disks about 40 mm apart in the radius direction from the center of the respective disks at a pushing force of 9.8 N for 10 seconds. In the way, the fingerprint was adhered thereon. Thereafter, 8 pieces from a commercially available facial tissue (manufactured by Crecia Corp.), which were in layers, were used to wipe off the disk slowly from the inner circumference thereof to the outer circumference so as to remove the fingerprint. The pushing force at the time of the wiping off was set into 4.9 N/cm$^2$, and the number of the wiping operation(s) was set into one. Thereafter, the jitter values (jitter value after the test) were again measured.

TABLE 2

| | | Jitter value (%) | |
|---|---|---|---|
| | | Initial | After the test |
| Optical recording disk sample No. 1 | Abrasion resistance | 7.6 | 7.6 |
| | Anti-staining property | 7.6 | 7.8 |
| Optical recording disk sample No. 2 | Abrasion resistance | 13.5 | 16.2 |
| | Anti-staining property | 13.5 | 17.3 |
| Optical recording disk sample No. 3 | Abrasion resistance | 7.7 | 7.8 |
| | Anti-staining property | 7.7 | 13.5 |

Results of the above-mentioned measurements are shown in Table 2.

As is clear from Table 2, the optical recording disk sample No. 1 was excellent in the initial jitter value and the jitter value after the both of the abrasion resistance test and anti-staining test.

In the above-mentioned example, the composite hard coat layer was given to the phase-change type optical disks. However, the present invention can be applied to read only type optical disks or write once type optical disks as well as optical disks having a phase-change type recording layer. The present invention can also be applied to not only optical information media but also optical lens, optical filters, anti-reflection films, and various display elements. Therefore, the above-mentioned working examples are merely examples in all points, and the present invention should not be restrictedly interpreted by the examples. Furthermore, all modifications belonging to a scope equivalent to that of the claims are within the scope of the present invention.

INDUSTRIAL APPLICABILITY

According to the present invention, an article with a hard coat, which has high abrasion resistance, good water repellency and lubricity, and significantly high durability, is inexpensively and easily provided.

The invention claimed is:

1. An article comprising a composite hard coat layer, the composite hard coat layer comprising:

a hard coat layer on a surface of the article; and an anti-staining surface layer directly on a surface of the hard coat layer;

wherein:

the hard coat layer comprises a cured product of a hard coat agent composition comprising an active energy ray-curable compound;

the anti-staining surface layer comprises a cured product of a surface layer material comprising an active energy ray-curable compound having an anti-staining property and/or a lubricating property; and the anti-staining surface layer is fixed on the hard coat layer by simultaneous curing of the hard coat agent composition and surface layer material.

2. The article according to claim 1, wherein the anti-staining surface layer has a thickness of from not less than 1 nm to not more than 100 nm.

3. The article according to claim 1, wherein the active energy ray-curable compound of the hard coat agent composition is a compound comprising at least one reactive group selected from the group consisting of a (meth)acryloyl group, a vinyl group and a mercapto group.

4. The article according to claim 1, wherein the active energy ray-curable compound of the surface layer material is a compound comprising at least one reactive group selected from the group consisting of a (meth)acryloyl group, a vinyl group and a mercapto group.

5. The article according to claim 1, wherein the active energy ray-curable compound of the surface layer material comprises a compound having:
   a moiety having at least one of a silicone-based substituent and a fluorine-containing substituent; and
   at least one reactive group selected from the group consisting of a (meth)acryloyl group, a vinyl group and a mercapto group.

6. The article according to claim 1, wherein the hard coat agent composition comprises a photopolymerization initiator, and optionally an inorganic filler.

7. An article, comprising:
   a hard coat layer on a surface of the article; and
   an anti-staining surface layer directly on a surface of the hard coat layer;
   wherein the article is produced by:
   applying a hard coat agent composition comprising an active energy ray-curable compound onto the surface of the article to form a hard coat agent composition layer;
   film-forming, on the surface of the hard coat agent composition layer, with a surface layer material comprising an active energy ray-curable compound having anti-staining property and/or lubricating property to form a surface material layer; and
   irradiating the formed hard coat agent composition layer and the formed surface material layer with active energy rays, curing the two layers simultaneously to form a composite hard coat layer comprising a hard coat layer contacting the surface of the article and an anti-staining surface layer contacting the surface of the hard coat layer.

8. The article according to claim 1, wherein the article is an optical recording medium, a magneto-optical recording medium, an optical lens, an optical filter, an anti-reflection film, or a display element.

9. The article according to claim 7, wherein the article is an optical recording medium, a magneto-optical recording medium, an optical lens, an optical filter, and anti-reflection film, or a display element.

10. A method for forming a composite hard coat layer, comprising:
    applying a hard coat agent composition onto a surface of an article to form a hard coat agent composition layer, the hard coat composition comprising an active energy ray-curable compound;
    film-forming, directly on a surface of the hard coat agent composition layer, with a surface layer material comprising an active energy ray-curable compound having an anti-staining property and/or a lubricating property, to form a surface material layer; and
    irradiating the formed hard coat agent composition layer and the formed surface material layer with active energy rays to simultaneously cure the layers and form the composite hard coat layer;
    wherein the composite hard coat layer comprises a hard coat layer in contact with the surface of the article and an anti-staining surface layer in contact with a surface of the hard coat layer.

11. The method according to claim 10, wherein the anti-staining surface layer has a thickness of from not less than 1 nm to not more than 100 nm.

12. The method according to claim 10, further comprising:
    drying the hard coat agent composition layer to remove a solvent contained in the hard coat agent composition;
    wherein the hard coat agent composition layer is dried after applying the hard coat agent composition, and before film-forming with the surface layer material.

13. The method according to claim 10, further comprising:
    optionally drying the hard coat agent composition layer; and
    irradiating the hard coat agent composition layer with active energy rays to obtain a half-cured hard coat agent composition layer;
    wherein the hard coat agent composition layer is optionally dried and irradiated after applying the hard coat agent composition and before film-forming with the surface layer material.

14. The method according to claim 10, wherein film-forming with the surface layer material comprises applying the surface layer material or depositing the surface layer material.

15. The method according to claim 14, wherein film-forming with the surface layer material comprises:
    dissolving the surface layer material in a solvent such that the active energy ray-curable compound of the hard coat agent composition layer is not substantially dissolved; and
    applying the surface layer material.

16. The method according to claim 10, wherein the active energy ray-curable compound of the hard coat agent composition comprises a compound having at least one reactive group selected from the group consisting of a (meth)acryloyl group, a vinyl group and a mercapto group.

17. The method according to claim 10, wherein the active energy ray-curable compound of the surface layer material comprises a compound having at least one reactive group selected from the group consisting of a (meth)acryloyl group, a vinyl group and a mercapto group.

18. The method according to claim 10, wherein the active energy ray-curable compound of the surface layer material comprises a compound having:
    a moiety having at least one of a silicone-based substituent and a fluorine-containing substituent; and
    at least one reactive group selected from the group consisting of a (meth)acryloyl group, a vinyl group and a mercapto group.

19. The method according to claim 10, wherein irradiating with active energy rays comprises irradiating with at least one of electron rays and ultraviolet rays.

20. The method according to claim 10, wherein irradiating with active energy rays comprises irradiating with active energy rays in an atmosphere having an oxygen concentration of 500 ppm or less.

* * * * *